(12) United States Patent
Shen et al.

(10) Patent No.: US 7,849,249 B2
(45) Date of Patent: *Dec. 7, 2010

(54) MOTHER-BOARD HAVING MULTIPLE GRAPHICS INTERFACES

(75) Inventors: Cheng-Lai Shen, Taipei (TW);
Hung-Hsiang Chou, Taipei (TW);
Chuan-Te Chang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/553,707

(22) Filed: Sep. 3, 2009

(65) Prior Publication Data

US 2009/0327559 A1  Dec. 31, 2009

Related U.S. Application Data

(63) Continuation of application No. 11/065,264, filed on Feb. 25, 2005, now Pat. No. 7,594,061.

(30) Foreign Application Priority Data

Nov. 8, 2004  (TW) ............................... 93134042 A

(51) Int. Cl.
*H05K 7/10* (2006.01)
(52) U.S. Cl. ..................... 710/301; 710/302; 710/316
(58) Field of Classification Search ................. 710/301, 710/302, 317, 316
See application file for complete search history.

(56) References Cited

U.S. PATENT DOCUMENTS

| | | |
|---|---|---|
| 5,799,204 A | 8/1998 | Pesto, Jr. |
| 6,232,932 B1 | 5/2001 | Thorner |
| 6,445,394 B1 | 9/2002 | Chow et al. |
| 6,587,082 B1 | 7/2003 | Moore |
| 6,624,823 B2 | 9/2003 | Deering |
| 6,918,001 B2 | 7/2005 | Fanning |
| 6,985,152 B2 | 1/2006 | Rubinstein et al. |
| 7,174,411 B1 | 2/2007 | Ngai |
| 7,174,412 B2 * | 2/2007 | Lin ............................. 710/316 |
| 7,293,125 B2 | 11/2007 | McAfee et al. |
| 2003/0131172 A1 | 7/2003 | Lin |

(Continued)

OTHER PUBLICATIONS

C.Sun, Gigabyte GA-K8NXP-9 NFORCE4 Ultra Motherboard Review, Nov. 12, 2004, p. 7, <http://www.pcstats.com/articleview.cfm?articleid=1677&page=7>.

(Continued)

*Primary Examiner*—Mark Rinehart
*Assistant Examiner*—Nimesh G Patel

(57) ABSTRACT

A mother-board includes a chipset, a switch, and first and second PCI Express X16 graphics interfaces. The switch has first and second switch circuits. The switch selectively turns on one of the first and second switch circuits according to a control signal. The first PCI Express X16 graphics interface has former eight lanes electrically connected to the chipset, and latter eight lanes selectively electrically connected to the chipset through the first switch circuit. The second PCI Express X16 graphics interface has former eight lanes selectively electrically connected to the chipset through the second switch circuit. When the first switch circuit is turned on, 16 lanes of the first PCI Express X16 graphics interface are electrically connected to the chipset. When the second switch circuit is turned on, the former eight lanes of the second PCI Express X16 graphics interface are electrically connected to the chipset.

18 Claims, 3 Drawing Sheets

U.S. PATENT DOCUMENTS

| | | |
|---|---|---|
| 2004/0088469 A1 | 5/2004 | Levy |
| 2004/0181617 A1 | 9/2004 | Sauber |
| 2005/0088445 A1 | 4/2005 | Gonzalez et al. |
| 2005/0102454 A1 | 5/2005 | McAfee et al. |
| 2005/0160212 A1 | 7/2005 | Caruk |
| 2005/0190190 A1 | 9/2005 | Diard et al. |
| 2005/0240703 A1 | 10/2005 | Nguyen et al. |
| 2005/0270298 A1 | 12/2005 | Thieret |
| 2006/0098016 A1 | 5/2006 | Chou et al. |
| 2006/0112210 A1* | 5/2006 | Tseng ................. 710/307 |

OTHER PUBLICATIONS

Budruk et al., PCI Express System Architecture, Sep. 4, 2003, pp. 30, 48~51, 712~715.

"Nvidia SLI Performance Preview with MSI's nForce4 SLI Motherboard," Anand Lal Shimpi, Oct. 29, 2004, pp. 1-2.

* cited by examiner

MOTHER-BOARD HAVING MULTIPLE GRAPHICS INTERFACES

CROSS-REFERENCE TO RELATED APPLICATION

This application is a continuation of application Ser. No. 11/065,264, filed on Feb. 25, 2005, the contents of which are incorporated herein by reference. This application also claims the benefit of priority of Taiwanese application Serial No. 93134042, filed on Nov. 8, 2004, the subject matter of which is likewise incorporated herein by reference.

BACKGROUND OF THE INVENTION

1. Field of the Invention

The invention relates in general to a mother-board, and more particularly to a mother-board having multiple PCI Express X16 graphics interfaces.

2. Description of the Related Art

Computer bus specifications have been developed from the ISA architecture (16 bit@8.33 Mhz) of the 1980 years to the PCI architecture (32 bit@33 Mhz) of the 1990 years and to the current AGP architecture (32 bit@66 Mhz). In the current peripheral interface card, particularly the graphics card (or display card), however, the data transmission amount thereof is getting more and more insufficient under the transmission architecture of the bus AGP. So, a new PCI Express bus specification has been proposed. The PCI Express utilizes the switch type peer-to-peer sequence transmission technology. The data transmission of the PCI Express utilizes a transmitter (Tx) and a receiver (Rx), which constitute a simplex lane. Each PCI Express individually utilizes its own lane to communicate with the corresponding chipset on the mother-board, and the bus-sharing architecture of the conventional PCI is no longer used.

The current transmission speed in the PCI Express single lane may reach 250 MB/s, and the occasion in the single lane is referred to as the PCI Express x1 (one lane) having a transmission bandwidth of 1×250=250 MB/s. In order to cover the transmission bandwidth requirements in various level fields, the current PCI Express has various specifications of x1, x2, x4, x8, x16, x32, and the like. Different specifications correspond to different foot piece designs, and thus have different physical lengths. The transmission bandwidth between the mother-board chipset and the graphics interface starts from the PCI Express x16 specification to 4 GB/s, which is sixteen times that of the PCI Express x1 and approaches twice of the current AGP X8 of 2.1 GB/s. The PCI Express also can operate in the full duplex mode. The PCI Express has a pair of two sets of specific transmitters and receivers. Each of the sets of specific transmitters and receivers only performs the one-way transmission, so the speed may be doubled. So, in the full duplex PCI Express x16 specification, the transmission bandwidth may reach 8 GB/s.

FIG. 1 is a schematic illustration showing the connection architecture of a conventional PCI Express x16 graphics interface. In the specification of the PCI Express x16 graphics interface 104, the transmission bandwidth may reach 8 GB/s. So, in the normal condition, all of the 16 lanes of the chipset 102 are connected to the only PCI Express x16 graphics interface 104. So, when the x16 graphics card (not shown in FIG. 1) is inserted into the PCI Express x16 graphics interface 104, the system operates in the x16 mode, and may utilize the transmission bandwidth of 8 GB/s ideally. However, the current x16 graphics card only can utilize the transmission bandwidth of about 4 GB/s, and the transmission bandwidth of the residual 4 GB/s is not utilized. Thus, the cost efficiency cannot be satisfied. As a result, it is an important subject in the industry to optimize the high transmission bandwidth provided by the PCI Express x16 graphics interface 104 and sufficiently increase the system display efficiency without wasting the redundant transmission bandwidth.

SUMMARY OF THE INVENTION

It is therefore an object of the invention to provide a system architecture of a mother-board capable of optimizing graphics interfaces so as to sufficiently increase the system display efficiency without wasting the transmission bandwidth under the high transmission bandwidth provided by the graphics interfaces.

The invention achieves the above-identified object by providing a mother-board, which comprises a chipset, a switch, a first graphics interface and a second graphics interface. The switch has a first switch circuit and a second switch circuit. The switch selectively turns on one of the first switch circuit and the second switch circuit according to a control signal. The first graphics interface has M lanes. X lanes of the M lanes of the first graphics interface are electrically connected to the chipset. Y lanes of the first graphics interface are selectively electrically connected to the chipset through the first switch circuit, M, X, Y are positive integers, and M=X+Y. The second graphics interface has M lanes. $X_1$ lanes of the M lanes of the second graphics interface are selectively electrically connected to the chipset through the second switch circuit, and $X_1$ is a positive integer and $X_1 \leq Y$.

When the first switch circuit is turned on, the Y lanes of the first graphics interface are electrically connected to the chipset through the first switch circuit. When the second switch circuit is turned on, the $X_1$ lanes of the second graphics interface are electrically connected to the chipset through the second switch circuit.

The invention also achieves the above-identified object by providing a mother-board, which includes a chipset, a switch, a first PCI Express X16 graphics interface and a second PCI Express X16 graphics interface. The switch has a first switch circuit and a second switch circuit. The switch selectively turns on one of the first switch circuit and the second switch circuit according to a control signal. The first PCI Express X16 graphics interface has former eight lanes directly electrically connected to the chipset, and latter eight lanes selectively electrically connected to the chipset through the first switch circuit. The second PCI Express X16 graphics interface has former eight lanes selectively electrically connected to the chipset through the second switch circuit. When the first switch circuit is turned on, 16 lanes of the first PCI Express X16 graphics interface are electrically connected to the chipset. When the second switch circuit is turned on, the former eight lanes of the second PCI Express X16 graphics interface are electrically connected to the chipset. Now the first PCI-E X16 graphics interface still has former 8 lanes directly connected to the chipset.

The invention also achieves the above-identified object by providing a mother-board, which includes a chipset, a switch, a first PCI Express X16 graphics interface and a second PCI Express X16 graphics interface. The switch has a first input port, a second input port and an output port. The switch selectively electrically connects one of the first input port and the second input port to the chipset through the output port according to a control signal. The first PCI Express X16 graphics interface has former eight lanes electrically connected to the chipset and latter eight lanes electrically connected to the first input port of the switch. The second PCI Express X16 graphics interface has former eight lanes electrically connected to the second input port of the switch.

The invention also achieves the above-identified object by providing a mother-board, which includes a chipset, a switch and N graphics interfaces. The switch has N switch circuits. The switch selectively turns on the N switch circuits according to a control signal. The N switch circuits include a first switch circuit, a second switch circuit to an N-th switch circuit, and N is a positive integer. The N graphics interfaces include a first graphics interface to an N-th graphics interface. The first to N-th graphics interfaces are electrically connected to the chipset through the corresponding switch circuits, respectively. The first graphics interface has M lanes. X lanes of the M lanes of the first graphics interface are electrically connected to the chipset, the residual Y lanes of the first graphics interface are selectively electrically connected to the chipset through the first switch circuit, M, X, Y are positive integers, and M=X+Y. $X_1$ to $X_{N-1}$ lanes of a second graphics interface to the N-th graphics interface of the N graphics interfaces are selectively electrically connected to the chipset through the second switch circuit to the N-th switch circuit, respectively, $X_1$ to $X_{N-1}$ are positive integers, and a sum of $X_1$ to $X_{N-1}$ is smaller than or equal to Y. The second switch circuit to the N-th switch circuit are cut off when the first switch circuit is turned on, and at least one of the second switch circuit to the N-th switch circuit is turned on when the first switch circuit is cut off.

Other objects, features, and advantages of the invention will become apparent from the following detailed description of the preferred but non-limiting embodiments. The following description is made with reference to the accompanying drawings.

DETAILED DESCRIPTION OF THE INVENTION

Currently, the PCI Express interface specifies various specifications of various transmission bandwidths, such as x1, x2, x4, x8, x16, x32, and the like, and different specifications have different foot piece designs. Thus, the corresponding graphics interfaces may have different physical lengths, and the corresponding lane sets have 1, 2, 4, 8, 16, and 32 lanes. However, the PCI Express has the downwards compatible design. For example, the PCI Express x16 interface can be connected to an inserted x16 interface card as well as an inserted x8, x4, x2 or x1 interface card, and can operate with the corresponding transmission bandwidth. Alternatively, when the x16 interface card is inserted into the PCI Express x16 interface, the interface can operate with the x16 transmission bandwidth as well as the x8, x4, x2 or x1 transmission bandwidth. In other words, the PCI Express x16 graphics interface has 16 lanes electrically connected to the chipset. When the PCI Express x16 graphics interface is connected to the inserted x16 graphics card, the x16 graphics card communicates with the chipset through the 16 lanes of the PCI Express x16 graphics interface. The maximum transmission bandwidth between the PCI Express x16 graphics interface and the x16 graphics card is 8 Gbytes/s. Alternatively, when the x16 graphics card communicates with the chipset through 8 lanes of the PCI Express x16 graphics interface, the transmission bandwidth between the PCI Express x16 graphics interface and the x16 graphics card is 4 Gbytes/s.

In practice, however, the present x16 graphics card only utilizes the transmission bandwidth of at most about 4 Gbytes/s. So, even if the x16 graphics card is inserted into the PCI Express x16 graphics interface and communicates with the PCI Express x16 graphics interface with 16 lanes, the transmission bandwidth of only about 4 Gbytes/s is used, and the residual transmission bandwidth of 4 Gbytes/s is not used. So, the cost efficiency cannot be satisfied.

One spirit of the invention is to utilize a switch mechanism to distribute the maximum transmission bandwidth (e.g., 8 Gbytes/s), which is provided by the lanes (e.g., 16 lanes) between the chipset and the graphics interfaces, among multiple graphics cards, such that these graphics cards can operate in parallel and simultaneously process the display frames. Thus, the display efficiency is higher than that when only one graphics card is utilized.

Figure 2:
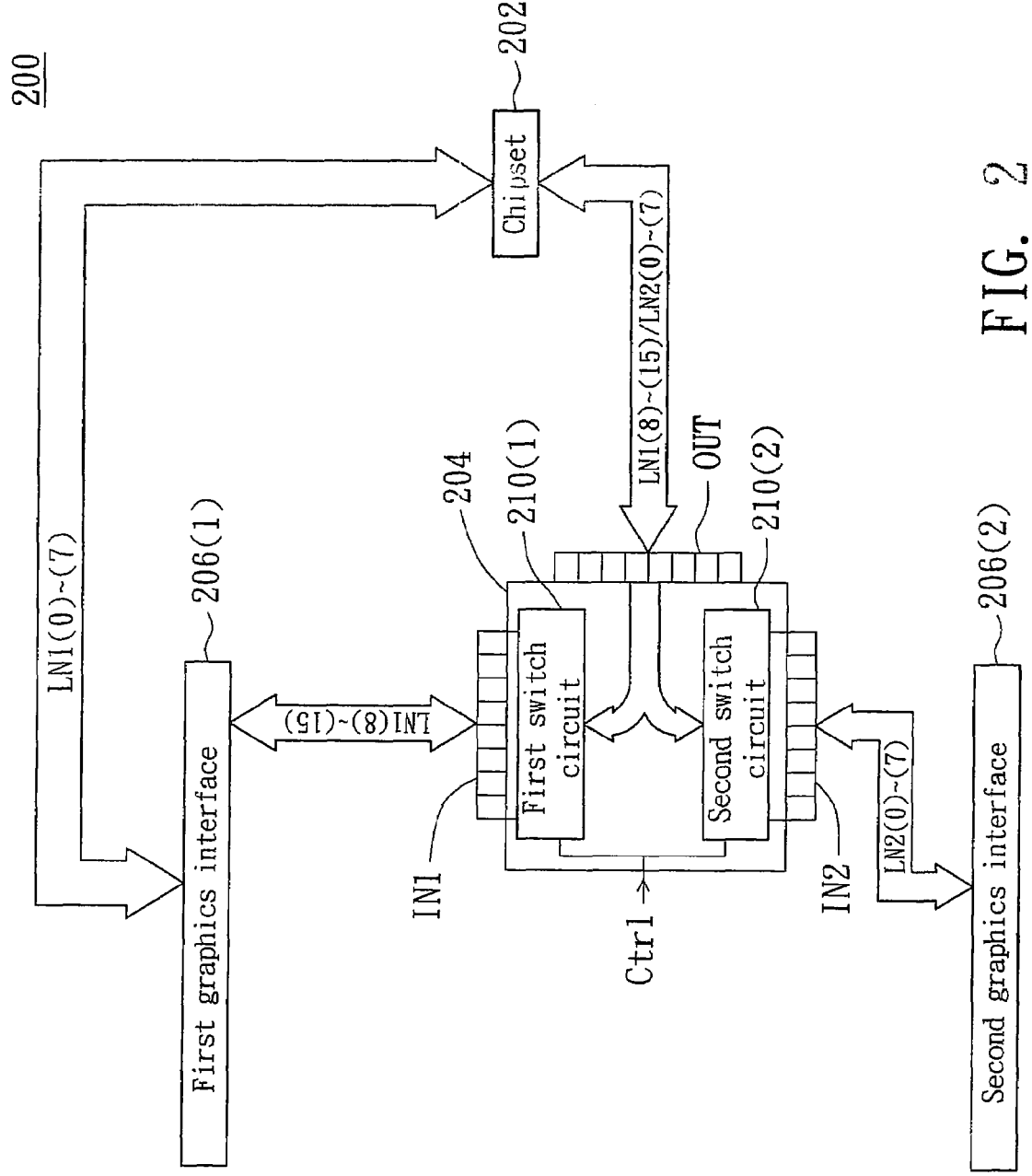
FIG. 2 is a schematic illustration showing the architecture of a mother-board according to a preferred embodiment of the invention.

FIG. 2 is a schematic illustration showing the architecture of a mother-board according to a preferred embodiment of the invention. The mother-board 200 includes a chipset 202, a switch 204, a first graphics interface 206(1) and a second graphics interface 206(2). The switch 204 has a first switch circuit 210(1) and a second switch circuit 210(2). The switch 204 selectively turns on one of the first switch circuit 210(1) and the second switch circuit 210(2) according to a control signal Ctrl. Each of the first graphics interface 206(1) and the second graphics interface 206(2) comprises M lanes. X lanes of the M lanes of the first graphics interface 206(1) are electrically connected to the chipset 202, and the residual Y lanes of the first graphics interface 206(1) are electrically connected to the chipset 202 through the first switch circuit 210(1), wherein M, X and Y are positive integers. $X_1$ lanes of the M lanes of the second graphics interface 206(2) are selectively electrically connected to the chipset 202 through the second switch circuit 210(2), wherein $X_1$ is a positive integer and $X_1 \leq Y$. When the first switch circuit 210(1) is turned on, Y lanes of the first graphics interface 206(1) are electrically connected to the chipset 202 through the first switch circuit 210(1). When the second switch circuit 210(2) is turned on, $X_1$ lanes of the second graphics interface 206(2) are electrically connected to the chipset 202 through the second switch circuit 210(2).

In detail, the first graphics interface 206(1) and the second graphics interface 206(2) may be, for example, a first PCI Express X16 graphics interface and a second PCI Express x16 graphics interface, each of which comprises 16 lanes (M=16). X lanes of the first PCI Express X16 graphics interface 206(1) are the former eight lanes (LN1(0)~(7)) of the first PCI Express X16 graphics interface 206(1), wherein X=8. The residual Y lanes of the first PCI Express X16 graphics interface 206(1) are the latter eight lanes (LN2(8)~(15)) of the first PCI Express X16 graphics interface 206(1), wherein Y=8. The $X_1$ lanes of the second PCI Express X16 graphics interface are the former eight lanes (LN2(0)~(7)) of the second PCI Express X16 graphics interface, wherein $X_1$=8.

So, when the first switch circuit 210(1) is turned on, the second switch circuit 210(2) is cut off, and the latter eight lanes (LN1(8)~(15)) of the first PCI Express X16 graphics interface 206(1) can be electrically connected to the chipset 202 through the first switch circuit 210(1). At this time, 16 lanes (LN1(0)~(15)) of the first PCI Express X16 graphics interface 206(1) are electrically connected to the chipset 202. When the second switch circuit 210(2) is turned on, the first switch circuit 210(1) is cut off, the former eight lanes (LN2 (0)~(7)) of the second PCI Express X16 graphics interface 206(2) are electrically connected to the chipset 202, and the former eight lanes (LN1(0)~(7)) of the first PCI Express X16 graphics interface 206(1) are compatible electrically connected to the chipset 202.

The application of the invention will be described with reference to an example. When the first PCI Express X16 graphics interface 206(1) is connected to a first interface card, which is, for example, a first graphics card (not shown in FIG. 2), and the second PCI Express X16 graphics interface 206(2) is connected to a second interface card, which is, for example, a second graphics card (not shown in FIG. 2), the user can determine the control signal Ctrl to selectively turn on the first switch circuit 210(1) or second switch circuit 210(2) through the basic input/output system (BIOS). When the second switch circuit 210(2) is turned on and the first switch circuit 210(1) is cut off, the first graphics card communicates with the chipset 202 through the former eight lanes (LN1(0)~(7)) of the first PCI Express X16 graphics interface 206. Meanwhile, the second graphics card communicates with the chipset 202 through the former eight lanes (LN2(0)~(7)) of the second PCI Express X16 graphics interface 208 and the second switch circuit 210(2). Consequently, the maximum transmission bandwidth of 8 GB/s provided by the 16 lanes between the chipset 202 and the first and second PCI Express x16 graphics interfaces 206 and 208 may be shared by two graphics cards (first and second graphics cards) through the switch 204, such that the two graphics cards can operate in parallel, the display frames may be simultaneously processed by the two graphics cards, and the display may be thus enhanced.

Figure 1:
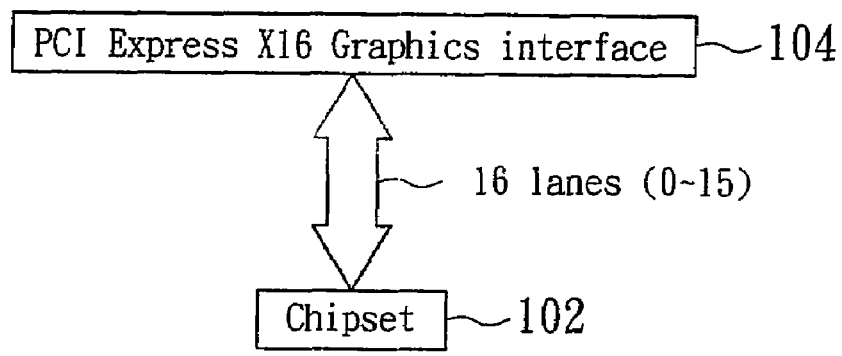
FIG. 1 is a schematic illustration showing the connection architecture of a PCI Express x16 graphics interface according to the prior art.
Figure 3:
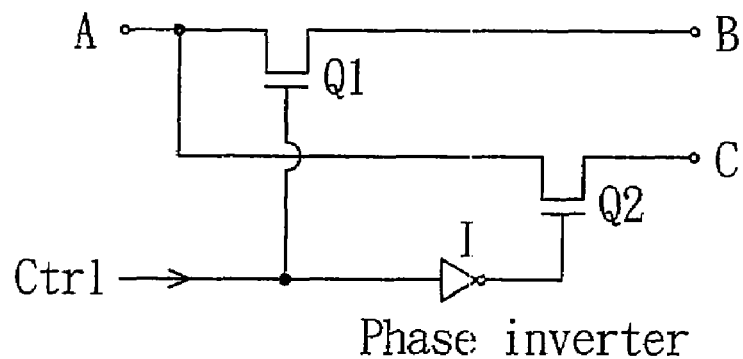
FIG. 3 is a schematic illustration showing the basic architecture of an example of a quick-switch according to a preferred embodiment of the invention.

In detail, a preferred embodiment of the switch 204 is a quick-switch. FIG. 3 is a schematic illustration showing the basic architecture of an example of a quick-switch. When the control signal Ctrl is enabled to be a high level, the transistor Q1 turns on, and the control signal Ctrl becomes a low level to make the transistor Q2 be cut off after passing through an phase inverter I. So, the signal is transferred from A terminal to B terminal through the transistor Q1. On the contrary, when the control signal Ctrl is disabled to be a low level, the transistor Q1 is cut off, the transistor Q2 turns on, and the signal is transferred from the A terminal to C terminal through the transistor Q2. Because each lane has a transmitter (Tx) and a receiver (Rx), each of which needs two transmission cables, one lane has four cables. Thus, 8 lanes need 32 transistors Q1 serving as the first switch circuit, and 32 transistors Q2 serving as the second switch circuit 210(2). As shown in FIG. 2 and according to the circuit architecture of FIG. 3, the latter eight lanes of the 16 lanes of the PCI Express X16 graphics interface are respectively connected to 32 A-terminals of the first switch circuit 210(1), which serve as output ports OUT of the switch 204, the latter eight lanes (LN1(7)~(15)) of the first PCI Express X16 graphics interface 206 are respectively connected to 32 B-terminals of the first switch circuit 210(1), which serve as first input ports IN1 of the switch 204, and the former eight lanes (LN2(0)~(7)) of the second PCI Express X16 graphics interface 208 are respectively connected to 32 C-terminals of the second switch circuit 210(2), which serve as second input ports IN2 of the switch 204. So, the maximum transmission bandwidth of 8 Gbytes/s provided by the 16 lanes between the chipset 202 and the PCI Express x16 graphics interface may be shared by two graphics cards through the switch.

However, the embodiment of the switch 204 is not limited to the quick-switch. Any switch may be chosen as long as the latter eight lanes (LN1(8)~(15)) can be electrically connected from the chipset 202 to the first PCI Express X16 graphics interface 206 through the switch 204, or the former eight lanes (LN2(0)~(7)) can be electrically connected from the chipset 202 to the second PCI Express X16 graphics interface 208 through the switch 204.

Using the quick-switch as the embodiment has the advantages of low signal noise and high signal transmission speed. In addition, the user does not have to do any setting owing to the design architecture of the quick-switch. For example, when the first PCI Express X16 graphics interface 206 is connected to the inserted first graphics card, the system automatically operates in the x16 mode. At this time, the second graphics card is inserted into the second PCI Express X16 graphics interface 208, and the system automatically determines the control signal Ctrl to turn on the second switch circuit 210(2) of the switch 204. As a result, the system can automatically operate using two graphics cards in the 2 sets of x8 modes, such that the user does not have to do any setting manually on the mother-board 200. In using a conventional mother-board, for example, the user has to complicatedly turn off the power, open the casing, find the corresponding switching device (switch, jump or the like) on the mother-board 200, and then set the settings manually so that the two graphics cards can operate simultaneously.

Figure 4:
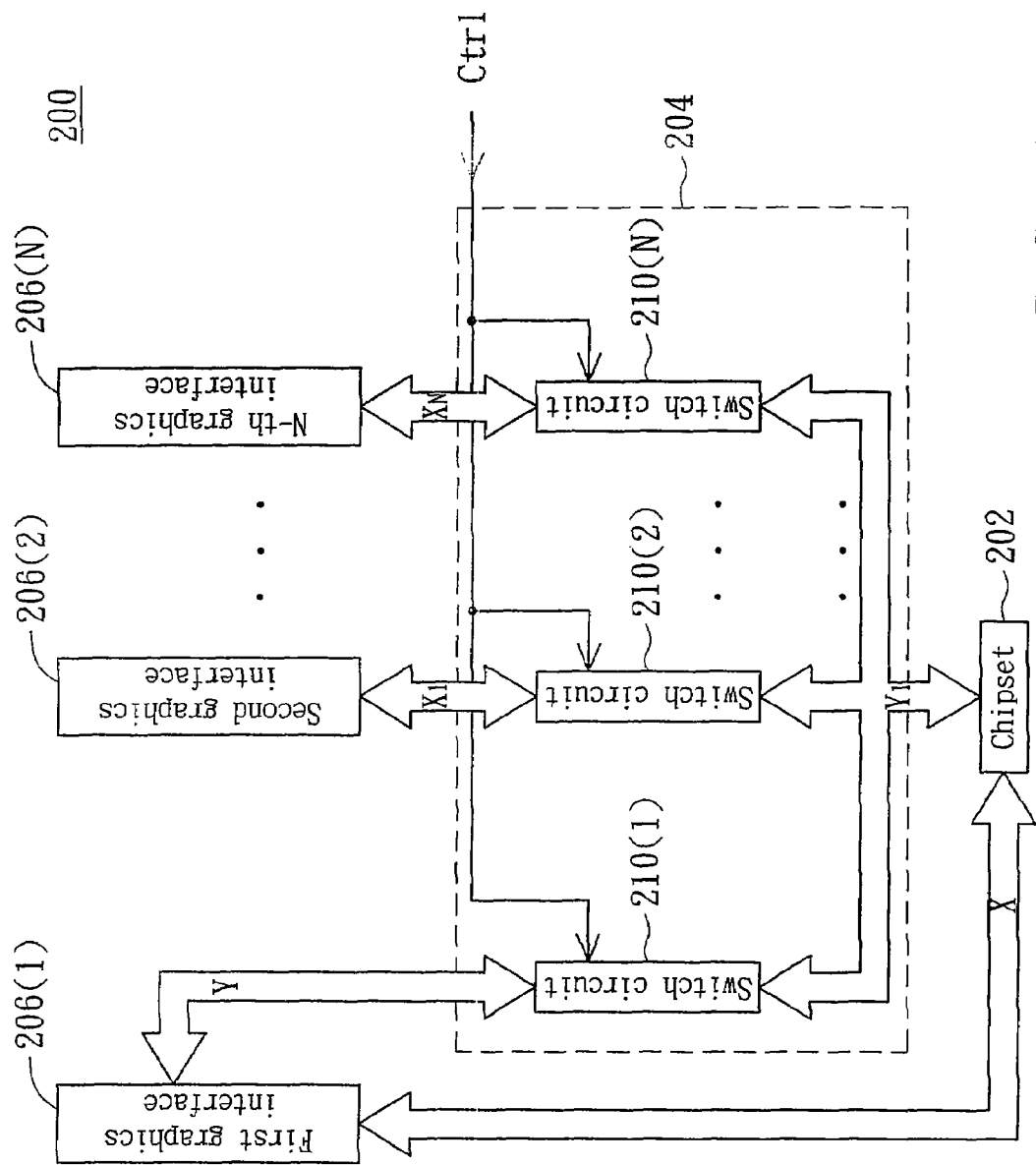
FIG. 4 is a schematic illustration showing the architecture of a mother-board having multiple graphics interfaces according to a preferred embodiment of the invention.

FIG. 4 is a schematic illustration showing the architecture of a mother-board having multiple graphics interfaces. Referring to FIG. 4, the mother-board 202 may also include multiple graphics interfaces 206. For example, N graphics interfaces 206 include a first graphics interface 206(1) to a N-th graphics interface 206(N), wherein N is a positive integer. The first graphics interface 206(1) to the N-th graphics interface 206(N) are electrically connected to the chipset 202 through the corresponding switch circuits 210, respectively. So, the switch 204 has N switch circuits 210 and selectively turns on N switch circuits 210 according to the control signal Ctrl. The N switch circuits 210 include a first switch circuit 210(1), a second switch circuit 210(2) to a N-th switch circuit 210(N). Similarly, the first graphics interface 206(1) has M lanes. X lanes of the M lanes of the first graphics interface 206(1) are electrically connected to the chipset 202, and the residual Y lanes of the first graphics interface 206(1) are selectively electrically connected to the chipset 202 through the first switch circuit 210(1), wherein M, X and Y are positive integers. $X_1$ to $X_{N-1}$ lanes in the second graphics interface 206(2) to the N-th graphics interface 206(N) of the N graphics interfaces are selectively electrically connected to the chipset 202 through the second switch circuit 210(2) to the N-th switch circuit 210(N), respectively, wherein $X_1$ to $X_{N-1}$ are positive integers and a sum of $X_1$ to $X_{N-1}$ is smaller than or equal to Y.

When the first switch circuit 210(1) is turned on, the second switch circuit 210(2) to the N-th switch circuit 210(N) are cut off. When the first switch circuit 210(1) is cut off, at least one switch circuit in the second switch circuit 210(2) to the N-th switch circuit 210(N) is turn on.

N graphics interfaces, such as PCI Express interfaces, utilize the spirit of the invention to allocate the M (=X+Y) lanes provided by the chipset 202 through the switch 204 among N graphics interfaces. That is, the Y lanes after the first graphics interface are allocated among the $X_1$ to $X_{N-1}$ lanes of the second graphics interface to the N-th graphics interface. So, the mother-board 200 of the invention also can provide M lanes for N interface cards such that N graphics cards can be inserted to enhance the display efficiency.

In summary, the invention has the following advantages.

1. The user can operate in a more convenient way according to the switch 204, and he or she can momentarily set the control signal through the BIOS or the operation system. In addition, the area occupied by the switch 204 on the mother-board 200 is not large such that the area of the mother-board 200 is not greatly increased in correspondence with the added second graphics interface 208. Thus, the size of the mother-board 200 may be kept small in various system architectures, such as the popular barebone system, which has a miniaturized space design and can utilize the architecture of the mother-board 200 of this embodiment.

2. Taking the PCI Express x16 graphics interface as an example, the maximum transmission bandwidth of 8 Gbytes/s provided by the 16 lanes between the chipset and the PCI Express x16 graphics interface is shared by two graphics cards, such that the two graphics cards can operate in parallel and the display frames are processed by the two graphics cards simultaneously. Consequently, the display efficiency is higher than that when only one graphics card is used, and the state of the switch can be conveniently set and switched by way of software (setting in the BIOS).

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mother-board, comprising:
a processing unit having a plurality of lanes, the lanes comprising lanes of a first group and lanes of a second group;
a first switch circuit and a second switch circuit receiving a control signal having a digital first state or a digital second state and selectively turning on in response to the control signal;
a first graphics interface having M lanes, each of the M lanes comprising a transmitter and a receiver and the M lanes including X and Y lanes, wherein M, X, Y are positive integers, X and Y being smaller than M, wherein
X lanes of the M lanes of the first graphics interface are permanently connected to the lanes of the first group of the processing unit,
Y lanes of the first graphics interface are connected to the first switch circuit and selectively electrically connected to the lanes of the second group of the processing unit through the first switch circuit when the control signal is in its first state to turn the first switch circuit on, and
a second graphics interface having X1 lanes connected to the second switch circuit and selectively electrically connected to the lanes of the second group of the data processing unit through the second switch circuit when the control signal is in its second state to turn the second switch circuit on, X1 being a positive integer and each of the X1 lanes comprising a transmitter and a receiver.

2. The mother-board according to claim 1, wherein each of the first graphics interface is a PCI express X16 graphics interface and comprises 16 lanes, and M=16.

3. The mother-board according to claim 2, wherein the X lanes of the 16 lanes of the first graphics interface are eight low-numbered lanes of the first graphics interface.

4. The mother-board according to claim 3, wherein the Y lanes of the 16 lanes of the first graphics interface are eight high-numbered lanes of the first graphics interface.

5. The mother-board according to claim 4, wherein the $X1 \leq Y$, where X1 is the amount of lanes which the second graphics interface has, and Y is the amount of lanes which the first graphic interface has.

6. The mother-board according to claim 1, wherein the control signal is determined by a basic input/output system (BIOS).

7. The mother-board according to claim 6, wherein when the first graphics interface is connected to a first interface card and the second graphics interface is connected to a second interface card, the control signal enables the second switch circuit to be turned on.

8. The mother-board according to claim 7, wherein each of the first interface card and the second interface card is a graphics card.

9. The mother-board according to claim 7, wherein when the control signal is in its first state, the first interface card communicates with the processing unit through eight low-numbered lanes of the first graphics interface, and the second interface card communicates with the processing unit through eight low-numbered lanes of the second graphics interface.

10. The mother-board according to claim 7, wherein when the first graphics interface is connected to the first interface card and the second graphics interface is not connected to the second interface card, the control signal enables the first switch circuit to be turned on.

11. The mother-board according to claim 10, wherein when the first switch circuit is turned on, the first interface card communicates with the processing unit through 16 lanes of the first graphics interface.

12. A mother-board, comprising:
a processing unit having a plurality of lanes, the lanes comprising lanes of a first group and lanes of a second group;
a switch including a first input port, a second input port and an output port, wherein the switch receives a control signal having a first digital state or a second digital state and selectively electrically connects the first input port or the second input port to the lanes of the second group of the data processing unit through the output port in response to the control signal;
a first graphics interface having multiple lanes that are divided into two groups that are respectively permanently connected to the lanes of the first group of the processing unit and electrically connected to the first input port of the switch, wherein each lane of the first graphics interface comprises a transmitter and a receiver; and
a second graphics interface having multiple lanes that are electrically connected to the second input port of the switch, wherein each lane of the second graphics interface comprises a transmitter and a receiver.

13. The mother-board according to claim 12, wherein the switch comprises:
a first switch circuit coupled between the first input port and the output port; and a second switch circuit coupled between the second input port and the output port, wherein the switch selectively turns on the first switch circuit or the second switch circuit according to the state of the control signal, wherein when the first switch circuit is turned on, 16 lanes of the first graphics interface are electrically connected to the processing unit; and wherein when the second switch circuit is turned on, the former eight lanes of the second graphics interface are electrically connected to the processing unit.

14. The mother-board according to claim 13, wherein the control signal is determined by settings of a basic input/output system (BIOS).

15. The mother-board according to claim 13, wherein each of the first graphics interface and the second graphics interface is a PCI Express X16 graphics interface.

16. The mother-board according to claim 13, wherein when the first graphics interface is connected to a first graphics card and the second graphics interface is connected to a second graphics card, the control signal enables the second switch circuit to be turned on.

17. The mother-board according to claim 16, wherein when the second switch circuit is turned on, the first graphics card communicates with the processing unit through the eight low-numbered lanes of the first graphics interface, and the second graphics card communicates with the processing unit through the eight high-numbered lanes of the second graphics interface.

18. A mother-board, comprising:

a processing unit;

a switch including a first port, a second port and a third port connected to the processing unit, wherein the switch receives a control signal having a first digital state or a second digital state and thereby alternatively communicates the first port or the second port with the third port;

a first graphics interface having a first plurality of lanes, a first group of said first plurality of lanes of the first graphics interface being permanently connected to the processing unit, and a second group of said first plurality of lanes of the first graphics interface being connected to the first port of said switch, each lane of the first graphics interface having a transmitter and a receiver;

a second graphics interface having a second plurality of lanes, at least one of said second plurality of lanes of the second graphics interface being permanently connected to the second port of said switch, each lane of the second graphics interface having a transmitter and a receiver;

wherein the first graphics interface is electrically conducted with the switch when the switch is in a first status, and the second graphics interface is electrically conducted with the switch when the switch is in a second status.

* * * * *